United States Patent
Turnau, III et al.

(10) Patent No.: US 7,036,793 B2
(45) Date of Patent: May 2, 2006

(54) STOP VALVE

(75) Inventors: William F. Turnau, III, Canton, MI (US); Bradley E. Allstead, Trenton, MI (US); Steven J. Tokarz, Canton, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 10/458,877

(22) Filed: Jun. 10, 2003

(65) Prior Publication Data

US 2004/0021120 A1 Feb. 5, 2004

Related U.S. Application Data

(60) Provisional application No. 60/400,280, filed on Jul. 31, 2002.

(51) Int. Cl.
*F16K 25/00* (2006.01)

(52) U.S. Cl. ......................... 251/175; 251/192
(58) Field of Classification Search ................ 251/175, 251/192, 310, 309, 315.03, 312; 137/15.24
See application file for complete search history.

(56) References Cited

U.S. PATENT DOCUMENTS

| | | | |
|---|---|---|---|
| 2,961,214 A | 11/1960 | Freed | |
| 3,353,785 A * | 11/1967 | Eggers | 251/175 |
| 3,386,700 A * | 6/1968 | Greene et al. | 251/175 |
| 3,271,845 A | 9/1968 | Breher | |
| 3,552,439 A * | 1/1971 | Siver | 251/309 |
| 3,666,233 A | 5/1972 | Scaramucci | |
| 3,712,584 A | 1/1973 | Wise et al. | |
| 3,753,549 A * | 8/1973 | Rubright | 251/305 |
| 3,825,030 A | 7/1974 | Kalsi | |
| 3,961,770 A | 6/1976 | Wrasman | |
| 4,010,235 A | 3/1977 | Yardley et al. | |
| 4,038,358 A | 7/1977 | Wrasman | |
| 4,047,275 A | 9/1977 | Bake et al. | |
| 4,084,783 A | 4/1978 | Wrasman | |
| 4,171,711 A | 10/1979 | Bake et al. | |
| 4,172,583 A | 10/1979 | Wrasman | |
| 4,176,689 A | 12/1979 | Wrasman | |
| 4,234,011 A | 11/1980 | Bake et al. | |
| 4,289,296 A | 9/1981 | Krause | |
| 4,339,110 A | 7/1982 | Ortega | |
| 4,348,006 A | 9/1982 | Schmitt et al. | |
| 4,562,994 A | 1/1986 | MacDonald | |
| 4,609,177 A * | 9/1986 | Turner et al. | 251/175 |
| 4,628,962 A | 12/1986 | Pezzarossi | |
| 4,676,268 A | 6/1987 | Sano | |
| 4,778,152 A | 10/1988 | Logman | |
| 4,791,962 A | 12/1988 | Moen | |

(Continued)

*Primary Examiner*—John Bastianelli
(74) *Attorney, Agent, or Firm*—Edgar A. Zarins; Lloyd D. Doigan

(57) ABSTRACT

A stop valve includes a valve body, a multishot resilient control sleeve, O-ring and handle. The control sleeve is molded to the valve stem to create an integral but separately molded fluid control member. Inlet line pressure resiliently biases the side walls of the control sleeve and a circumferential sealing flap formed thereon into sealing engagement with the valve bore to prevent leakage. The control sleeve consists of a hard plastic cylinder and a flexible barrel member molded as one consistent piece by a multishot molding process. The O-ring also serves as a backup seal to prevent leakage to atmosphere. A valve handle is secured to the valve by either a screw or a snap protrusion.

6 Claims, 5 Drawing Sheets

U.S. PATENT DOCUMENTS

| | | | |
|---|---|---|---|
| 4,901,763 A * | 2/1990 | Scott ..................... 251/192 |
| 4,917,355 A | 4/1990 | Dark et al. |
| 5,100,103 A | 3/1992 | Conley et al. |
| 5,154,396 A | 10/1992 | Conley et al. |
| 5,409,654 A | 4/1995 | Platusich |
| 5,503,544 A | 4/1996 | Platusich |
| 5,695,159 A | 12/1997 | Adams |
| 5,901,944 A | 5/1999 | Ramakrishnan et al. |

\* cited by examiner

STOP VALVE

RELATED APPLICATIONS

This application claims priority from U.S. Provisional Application No. 60/400,280 filed on Jul. 31, 2002.

BACKGROUND OF THE INVENTION

I. Field of the Invention

A stop valve for controlling the flow of fluid through fluid lines and, in particular, to a stop valve manufactured through a multi-stage molding process to include a sealingly resilient fluid control sleeve and a more rigid valve stem for rotation of the sleeve.

II. Description of the Prior Art

A stop valve is a shut-off valve to permit the replacement of washers or other repairs to be accomplished on a plumbing fixture without shutting down an entire plumbing system. The stop valve is commonly located in the fixture supply line between a wall and the fixture. Stop valves are generally available in two basic styles. One style is known as an angle stop valve that has the inlet and outlet of the valve at right angles to each other. The other standard configuration is a straight-through arrangement wherein the inlet and outlet are coaxially aligned with each other.

One type of effective and efficient angle stop valve is disclosed in U.S. Pat. Nos. 4,562,994 and 4,609,177 to Turner et al and incorporated herein by reference. Another example of an angle stop valve is disclosed in U.S. Pat. No. 5,076,540 to Murphy and U.S. Pat. No. 5,695,169 to Higgins.

In all of these previous disclosures, the stop valve has a control sleeve made from low friction resilient thermoplastic material such as a Santoprene™ material. The handle is formed from a durable plastic material such as ABS. The operation of the valve from the open to the closed position is a simple quarter turn of the handle. The resilient plastic material of the valve control sleeve provides for a complete shut off of the water supply. As with all stop valves, these plastic stop valves may be left in the open position for many months and even years without being touched. The long period of time between use of the shut off valve allows for significant mineral deposit on the valve which may bind the valve within the valve body. The resulting binding necessitates the use of increased torque to be applied onto the valve to break the binding layer of mineral deposits in order to move the valve to the closed or shut off position. Additionally, stops need to be resistant to oxidative agents, freezing conditions and aggressive water conditions. Prior inventions containing a single plastic control sleeve could not provide sufficient performance under all water conditions. The torque required to break these binding barriers sometimes caused the valve stem to break, twist like a screw, or disconnect from the control sleeve leaving no means for closing the stop valve. The present invention overcomes the disadvantages of the prior known stop valves by using a multishot molding process to provide a control sleeve that has a flexible wall in the sealing area and a hard plastic stem for mechanical control.

SUMMARY OF THE INVENTION

The present invention overcomes the disadvantages of the prior known stop valves by using a multishot molding process to provide a control sleeve that has a flexible wall in the sealing area and a hard plastic stem for mechanical control.

In accordance with one aspect of the present invention, a plumbing valve includes a valve body having an inlet and an outlet. The flexible member of the resilient control sleeve is located within the valve body for rotation between an open and closed position. The sleeve is open at its axial inlet end and has a side wall of circular cross-section extending between the open inlet end and the end wall. The side wall has at least one outlet port in fluid communication with the inlet end. The sleeve side wall is contoured and dimensioned to be snugly but rotatably received within a receiving bore of the valve body for opening and closing the valve.

The closed end wall of the control sleeve has a hard plastic handle engaging stem section axially extending therefrom. The handle engaging stem section includes a geometric shape which mates with the handle. The handle stop rotation can be attained by either a corresponding geometric shape in the body or a protrusion from the body that mates with an integral feature of the handle. Desirably, the handle has a first annular section with internal geometric cross section that mates with the hard plastic section of the control sleeve. The handle is secured to the control sleeve by either using a fastener or mating the handle with a protrusion on the rigid stem.

In accordance with a preferred embodiment of the stop valve, the rigid valve stem facilitates the application of sufficient torque to break the binding forces sometimes found in such valves. Further, the softer material used to mold the control sleeve provides a sealing resilience to prevent fluid leakage past the control sleeve. The multishot molding process allows the valve stem to be molded to the previously molded control sleeve. Additional molding steps can be used to mold a locking retainer to the valve member and seal members which amount to integral O-ring seals.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
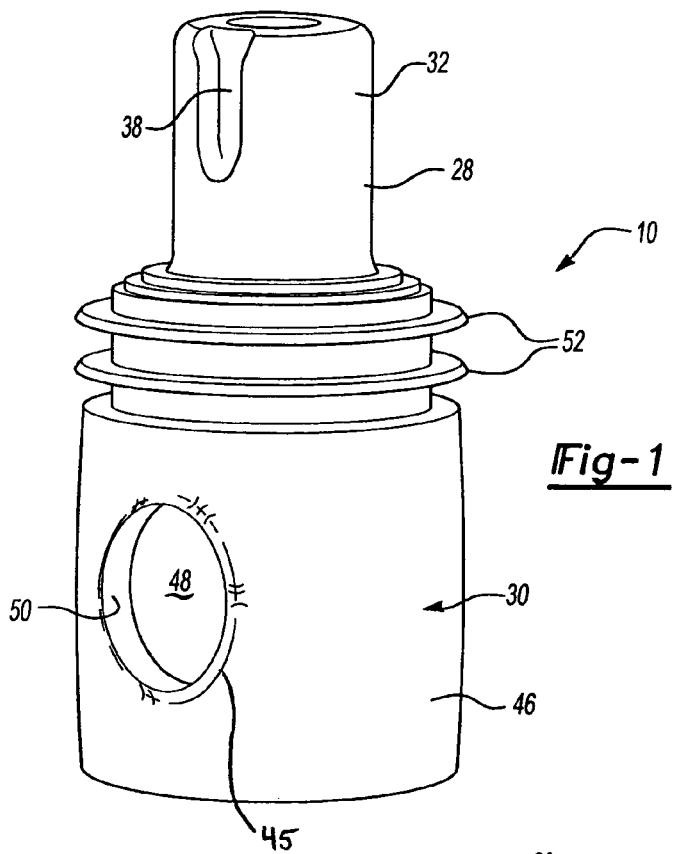
FIG. 1 is a perspective view of a multi-shot molded valve cartridge according to the present invention.
Figure 2:
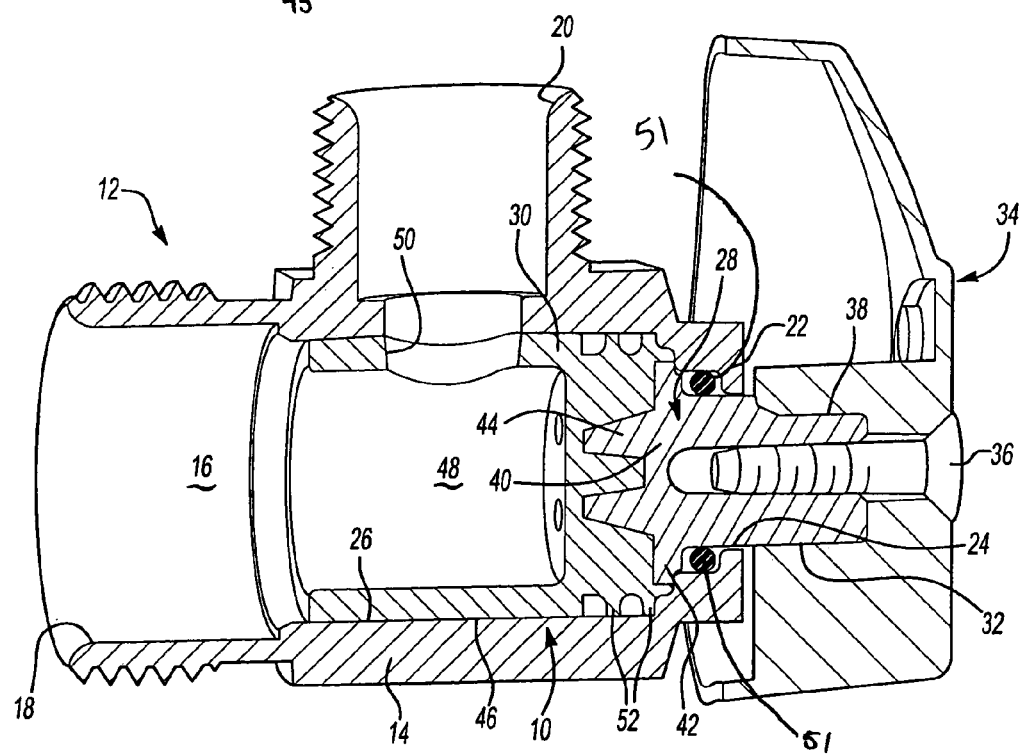
FIG. 2 is a cross-sectional view of an angle stop valve embodying the present invention.
Figure 3:
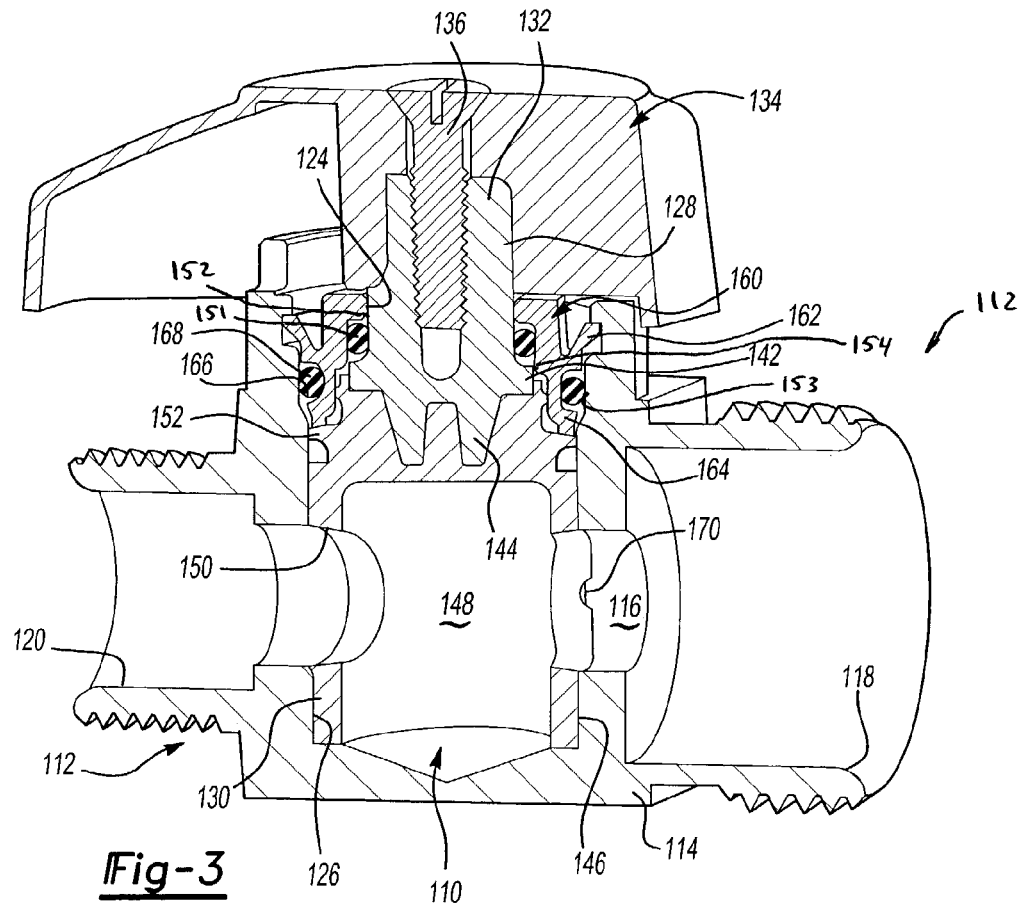
FIG. 3 is a cross-sectional view of a straight stop valve embodying the present invention.

Referring first to FIGS. 1 and 2, there is shown a valve member 10 manufactured in accordance with the present invention and designed to control the flow of fluid through a valve 12. As will be subsequently described, the valve member 10 is manufactured with sufficient strength and rigidity to withstand the torque associated with manipulation of the valve member 10 and with sufficient pliability and resiliency to prevent fluid leakage. These dual material properties provide an efficient and effective means of controlling fluid flow through the valve 12. The valve member 10 of the present invention will be described in conjunction with an angled valve (FIG. 2) and a straight valve (FIG. 3). The operation and properties of the valve member 10 are similar for both types of valves.

The valve 12 includes a valve body 14 having a housing chamber 16 for receiving the valve member 10. The valve body 14 includes an inlet 18 preferably connected to a fluid source and an outlet 20 connected to a plumbing fixture such as a riser which connects to a faucet (not shown). The valve 12 is designed to control the flow of fluid from the source to the fixture. In the angled valve 12, the inlet 18 and outlet 20 are disposed at a right angle to each other. An end wall 22 of the valve body 14 includes an aperture 24 through which the valve member 10 extends as will be subsequently described. The housing chamber 16 of the valve body 14 has a substantially cylindrical configuration with an interior surface 26.

The valve member 10 is rotatably received within the valve body 14 to control the flow of fluid therethrough. In a preferred embodiment of the present invention, the valve member 10 is formed of two components: a rigid valve stem 28 to withstand the torque applied to the valve member 10 and a more elastic valve sleeve 30 for improved fluid sealing.

The valve stem 28 has a substantially cylindrical portion 32 designed to engage a valve handle 34 for manipulation of the valve member 10. The valve handle 34 may matingly receive the cylindrical portion 32 of the valve stem 28 and may be secured to the valve stem 28 such as by a fastener 36 a press fit. The valve stem 28 extends through the aperture 24 of the end wall 22. In a preferred embodiment, the valve stem 28 includes at least one spline 38 to aid in the transmittal of rotation to the valve member 10. The valve stem 28 also includes a base portion 40 with a radially extending flange 42 and a tooth 44 to which the valve sleeve 30 is attached.

Preferably, the valve sleeve 30 is molded directly to the valve stem 28 in a multi-shot molding operation. However, the components could be attached using other well-known methods including insert molding, staking, ultrasonic welding, vibration and any other known mechanical and thermal-mechanical processes. The end result is a valve member 10 formed of two different materials to create a rigid stem 28 and an elastic sleeve 30 for use in a stop valve. In the preferred method, the sleeve 30 is first molded of a softer elastic material. Thereafter, a more rigid material is used to mold the valve stem 28. Of course, it is to be understood that the components of the valve member 10 could be molded in reverse order. During the molding process, the sleeve 30 is molded around the base portion 40 of the valve stem 28 to create a material bond between the valve sleeve 30 and the valve stem 28. The radial flange 42 and tooth 44 of the stem 28 provide increased surface area and mechanical interlock for bonding of the components.

The valve sleeve 30 has a substantially cylindrical cross-sectional configuration with an outer surface 46 closely conforming to the interior surface 26 of the valve body 14. In a preferred embodiment, the valve sleeve 30 is formed with a discrete barrel configuration having a slightly larger diameter along the midsection in order to seal within the valve member 14. The valve sleeve 30 could also have a bulge or protrusion 45 to seal the area around the port 50 against the valve body 14. The valve sleeve 30 is formed with an inner fluid chamber 48 open at one end for communication with the inlet 18 of the valve body 14. An outlet port 50 is formed in the wall of the valve sleeve 30 for selective communication with the outlet 20 of the valve member. Formed in the exterior surface 46 of the valve sleeve 30 is at least one annular sealing lip 52 which engages the surface 26 of the valve body 14 to prevent fluid leakage past the valve stem 28. An O-ring seal member may be used in place of the annular sealing lip 52 to control fluid flow. The elastic properties of the valve sleeve 30 improves sealing within the valve body 14 as the valve sleeve 30 is pressurized. The fluid pressure within the fluid chamber 48 pushes the wall of the valve sleeve 30 outwardly against the inner surface 26 of the valve body 14 to prevent fluid leakage between the valve sleeve 30 and the valve body 14.

The valve stem 28 may also accept an additional back-up seal 51 or O-ring which sealingly engages the inner wall 52 of the valve body 14. The additional back-up seal 51 prevents contaminants from entering the valve body 14 through the aperture 24 which could compromise the operation of the valve 10.

Figure 4:
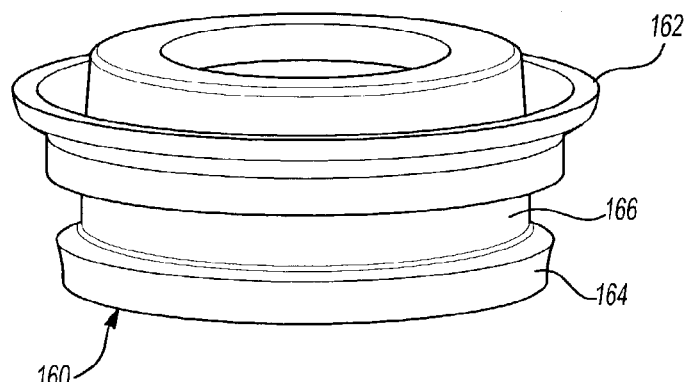
FIG. 4 is a perspective view of the valve retainer for the straight valve.
Figure 5:
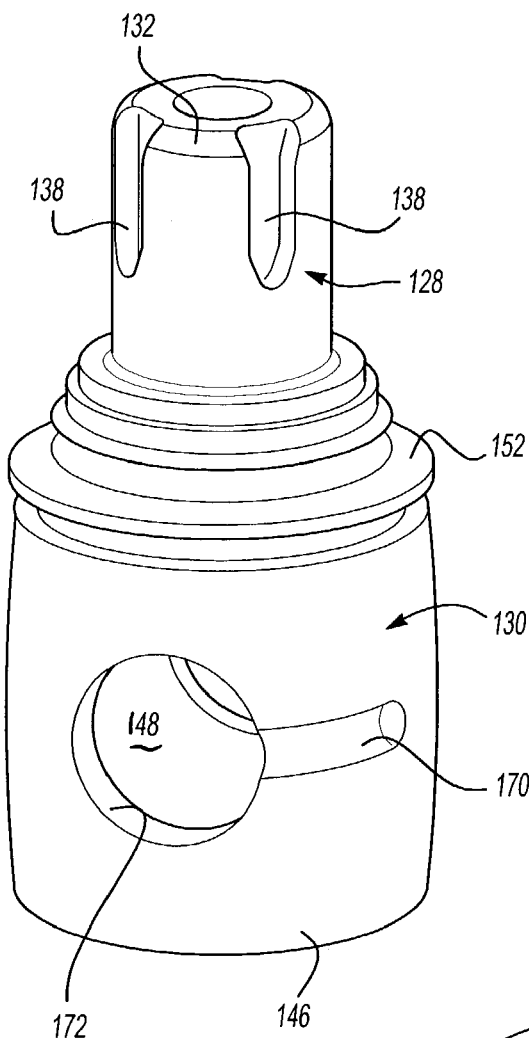
FIG. 5 is a perspective view of the valve member.
Figure 6:
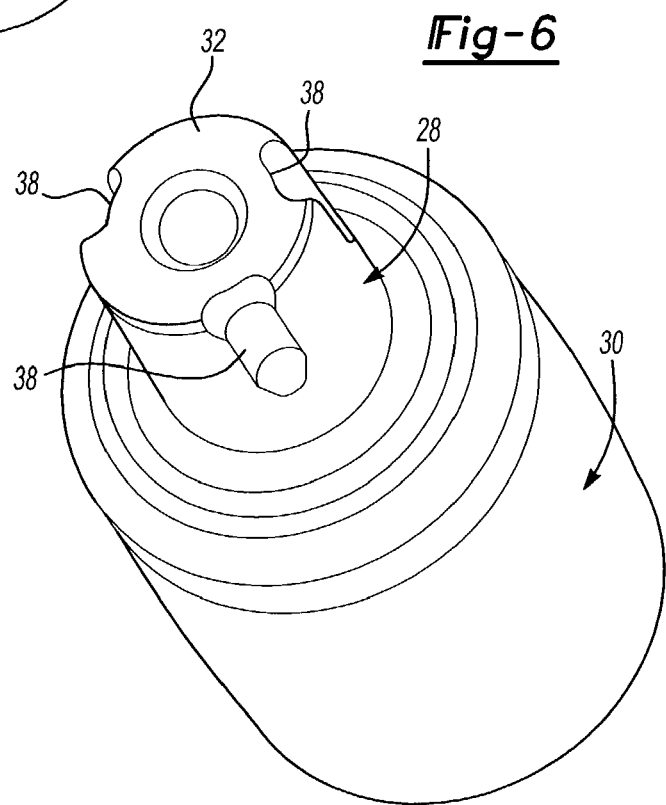
FIG. 6 is an end view of the valve member.

In the straight valve 112 shown in FIG. 3, the valve member 110 is received within the valve body 114 such that the fluid flows transversely through the valve member 110. In order to maintain the valve member 110 within the valve body 114, a retainer ring 160 is coaxially mounted to the valve member 110 proximate the junction of the valve stem 128 to the valve sleeve 130. The retainer ring 160 (FIG. 4) includes an annular locking flange 162 designed to lockingly engage the valve body 114. In this manner, the valve member is prevented from being inadvertently pushed through the aperture 124 of the valve body 114. The retainer ring 160 includes a secondary flange 164 which forms an annular pocket 166 for receiving an O-ring seal 168.

The back-up seal 151 sealingly engages the inner wall 152 of the valve body 114 to prevent contaminants from entering the valve body 114. The retaining shoulder 154 supports the seal 151 against the stem 128. An O-ring seal 153 is supported within the annular pocket 166 formed on the retainer ring 160.

Formed in the outer surface 146 of the valve sleeve 130 is a pressure groove 170 in communication with the inlet port 172 of the valve sleeve 130 in the closed position. The pressure groove 170 maintains pressure within the inner fluid chamber 148 prior to opening of the valve 112 in order to pressurize the valve sleeve 130 outwardly against the interior surface 126 of the valve body 114. The valve sleeve 130 essentially bulges outwardly to sealingly engage valve body and improve the operation of the valve 112.

Figure 7:
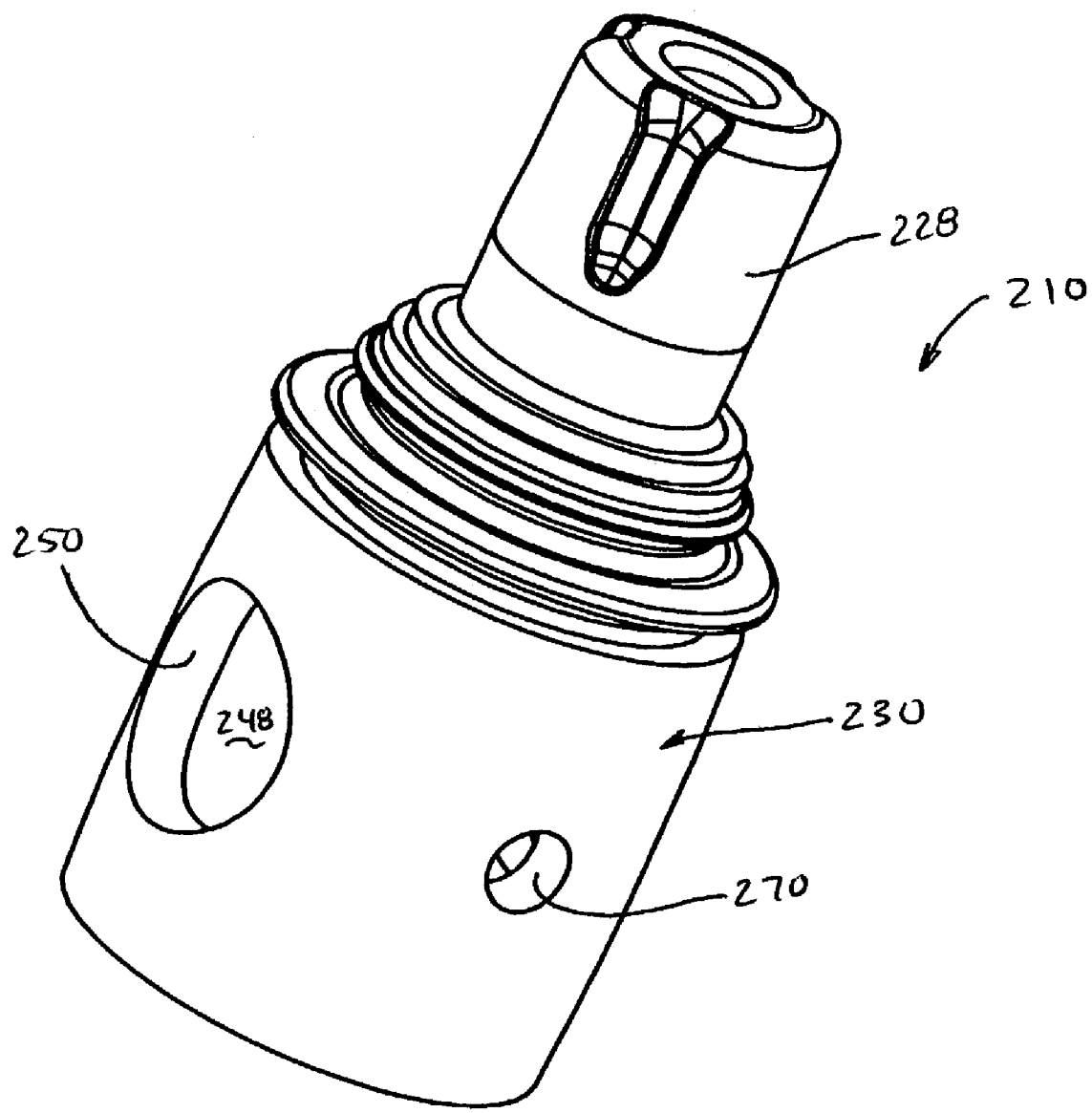
FIG. 7 is a perspective view of an alternative valve member.
Figure 8:
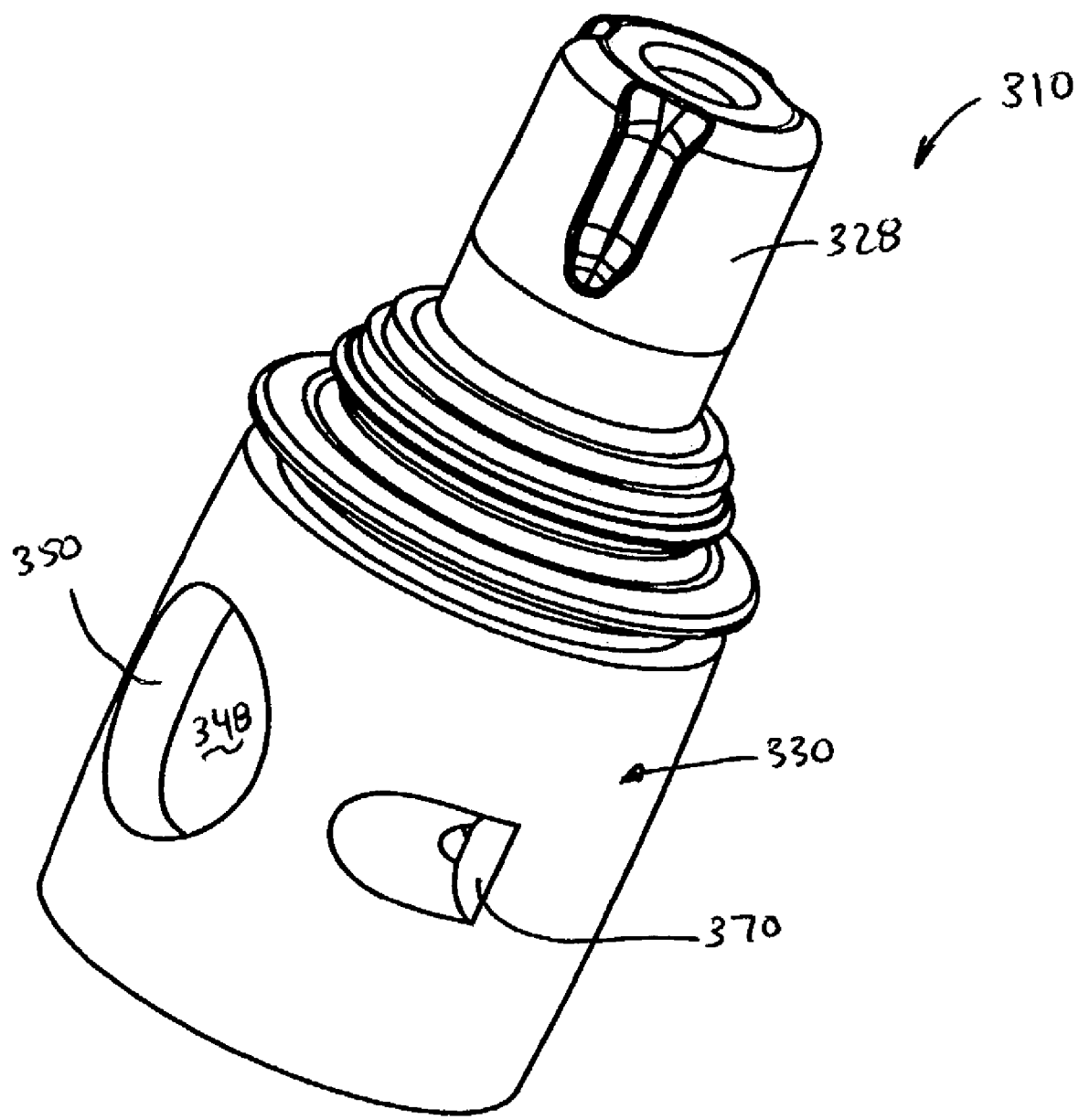
FIG. 8 is a perspective view of an alternative valve member.

Alternative embodiments of the valve member (210,310) are shown in FIGS. 7 and 8. In these embodiments, a simple aperture 270 or a semi-elliptical aperture 370 facilitates fluid communication with the inner fluid chamber 248,348. The opening 270,370 communicates with the inlet 118 in the closed position to keep the interior of the valve member 210,310 pressurized against the valve body. The opening 270 may be any configuration which allows fluid communication with the inner chamber.

The valve body 14 is preferably formed of an extruded brass which is subsequently machined to form the required bores and openings.

The control sleeve 30 can be made from a thermoplastic material by injection molding, liquid or reaction injection molding or any other suitable process for forming thermoplastics such as compression molding or rotomolding. Suitable thermoplastic materials for the control sleeve may include but are not limited to ABS, polypropylene, polycarbonate, polystyrene, nylon, polyester such as PET or PBT. Thermo set elastomer materials may also be used including but not limited to EPDM, Nitrile, Viton, Buna N or Neoprene. More preferable materials suitable for the control sleeve 30 include the family of materials known as thermoplastic elastomers including but not limited to the family of material under the tradename of Santoprene from AES Corp. such as Santoprene 243-40. A still further material may be from the family of thermoplastic silicates known as TPSIV. Other thermal plastic elastomers such as COPE, COPA or SEBS may be used. To achieve the proper torque range when the control sleeve 30 is rotated, the materials described above may be blended with any known internal lubricating agents such as PTFE powder, silicone oil, PTFE lubricants or a fatty acid. Alternatively, to facilitate the rotation of the control sleeve 30, the control sleeve 30 may be coated with a suitable material such as a lubricating agent. Any suitable barrier resistant coating material may be used as an agent on the sleeve 30.

The stem 28 can be formed of a metal or durable plastic material in a broad range of thermoplastics including but not limited to polypropylene, polycarbonate, ABS, PET, PBT, nylon, PPO/HIPS blend. To achieve a desired stiffness in the resulting stem 28, the thermoplastic may be filled with glass fiber or any suitable mineral fillers such as talc, or a mixture of the glass fiber and mineral filler. A preferable filled thermoplastic is glass-fiber filled polypropylene; the glass fiber content may range from 0 to as high as is allowed by the process used to shape the stem 28. Regardless of the choice of thermoplastic, the material must be such that the resulting stem possesses proper resilience to permit its assembly to the valve body 14 in the manner described above.

The stem 28 and control sleeve 30 may be molded as one integrated piece using one suitable material as described above. Preferably, the stem 28 and control sleeve 30 are molded sequentially in a two-shot molding process wherein the sleeve is first molded with a lower modulus material such as a thermoplastic elastomer as the first shot, followed by a second injection of a high modulus material such as a 30% glass-fiber filled polypropylene, to form the integrated stem and control sleeve plastic valve as described above. The interface between the first and second shot can be of any design as long as it allows the transfer of torque from the handle 34 and the stem 28 to the control sleeve 30.

In this fashion, the connection between the handle 34 and the stem 28 provides for the transfer of increased torque to overcome any long term mineral build-up or other deposit that may adhere the control sleeve 30 within the valve body or overcome any increased friction due to any bulging of the resilient control sleeve within the outlet port as described above.

The ability to significantly increase the maximum torque transfer allows this construction of a valve with the known desirable materials to more universally accepted, particularly in geographic areas where hard water with various minerals are the norm.

Furthermore, the valve with the improved stem connection can be confidently used in lines where the interim between using the shut off valve may be many years which may allow for a substantial build up of deposits that may otherwise bind the valve in the open position.

The manufacturing process yields an efficient molded valve member to control the flow through a valve. The two-shot molding process forms a valve member having a hard plastic shank or stem and a flexible plastic barrel. Alternatively, the stem may be formed or machined of brass and the flexible plastic barrel overmolded onto the stem. In a preferred embodiment, the shaft profile consists of three splines in order to transfer the torque applied to the handle to the valve member. The valve cylinder includes lip seals engaging the inner surface of the valve body to prevent leakage. To eliminate longitudinal movement of the valve member in the straight valve, the retainer ring is used to hold the valve cartridge within the valve body.

The foregoing detailed description has been given for clearness of understanding only and no unnecessary limitations should be understood therefrom as some modifications will be obvious to those skilled in the art without departing from the scope and spirit of the appended claims.

What is claimed is:

1. A valve member adapted to be rotatably received within a valve body to control the flow of fluid between an inlet and an outlet of the valve body, said valve member comprising:
   a valve stem extending from the valve body to facilitate manipulation of said valve member within the valve body, said valve stem having a substantially rigid material property and including a base portion;
   a valve stem attached to said base portion of said valve stem to materially bond said valve sleeve to said base portion of said valve stem such that manipulation of said valve stem is transmitted to said valve sleeve through said base portion of said valve stem;
   said valve sleeve having a substantially cylindrical configuration with an outer surface conforming to an interior surface of the valve body, said valve sleeve including an inner chamber and an outlet port wherein said valve sleeve is selectively movable between an open position directing fluid flow from the valve body inlet through said outlet port to the valve body outlet and a closed position preventing fluid flow through said valve body;
   said valve sleeve being molded as a separate component secured to said valve stem of a less rigid material than said valve stem to facilitate expansion under fluid pressure within said inner chamber to move said outer surface into sealing contact with the interior surface of the valve body for improved sealing within the valve body; and
   a pressure opening formed in said outer surface of said valve sleeve and in fluid communication with said sleeve chamber in order to selectively pressurize said inner chamber of said valve sleeve.

2. The valve member as defined in claim 1 wherein said valve stem includes an upper portion extending from the valve body with at least one longitudinally extending spline, said upper portion adapted to receive a handle to facilitate manipulation of said valve member.

3. The valve member as defined in claim 1 wherein said valve sleeve includes at least one annular sealing lip engaging the interior surface of the valve body.

4. The valve member as defined in claim 1 wherein said pressure opening is an aperture formed on said wall of said valve sleeve.

5. The valve member as defined in claim 1 wherein said pressure opening is a groove formed in said outer surface of said valve sleeve and in fluid communication with the interior of said valve sleeve.

6. The valve member as defined in claim 2 and further comprising a retainer ring coaxially mounted to said valve stem and valve sleeve, said retainer ring selectively engageable with the valve body to lockingly retain said valve member within the valve body.

* * * * *